US012806093B2

(12) United States Patent
Brunt

(10) Patent No.: US 12,806,093 B2
(45) Date of Patent: Nov. 24, 2026

(54) BATHING APPARATUS AND METHOD OF USING THE SAME

(71) Applicant: Venessa Brunt, Winston Salem, NC (US)

(72) Inventor: Venessa Brunt, Winston Salem, NC (US)

( * ) Notice: Subject to any disclaimer, the term of this patent is extended or adjusted under 35 U.S.C. 154(b) by 91 days.

(21) Appl. No.: 18/904,581

(22) Filed: Oct. 2, 2024

(65) Prior Publication Data

US 2025/0134766 A1 May 1, 2025

Related U.S. Application Data

(60) Provisional application No. 63/546,042, filed on Oct. 27, 2023.

(51) Int. Cl.
*A61G 7/00* (2006.01)
*A47K 3/03* (2006.01)
*A47K 3/07* (2006.01)
*A61H 33/00* (2006.01)

(52) U.S. Cl.
CPC .............. *A61G 7/0005* (2013.01); *A47K 3/03* (2013.01); *A47K 3/07* (2013.01); *A61H 33/6005* (2013.01)

(58) Field of Classification Search
CPC . A47K 3/022; A47K 3/03; A47K 3/06; A47K 3/062; A47K 3/07; A61G 7/0005
See application file for complete search history.

(56) References Cited

U.S. PATENT DOCUMENTS

| | | | | | |
|---|---|---|---|---|---|
| 3,559,216 | A * | 2/1971 | Kyte | A47K 3/007 | 4/555 |
| 5,181,284 | A * | 1/1993 | Raphael | A47K 3/024 | 4/573.1 |
| 5,247,712 | A * | 9/1993 | Williams | A47K 3/06 | 4/584 |
| D353,446 | S * | 12/1994 | Wheeler | D23/280.1 | |
| 5,661,856 | A * | 9/1997 | Kyte | A47K 3/06 | 4/584 |

(Continued)

FOREIGN PATENT DOCUMENTS

KR 20130052950 A * 5/2013 ........... A61G 7/0005

OTHER PUBLICATIONS

Place Patient on a Backboard. CERPP. https://www.youtube.com/watch?v=hXtCKkaEeOs. (Year: 2010).*

*Primary Examiner* — Erin Deery
(74) *Attorney, Agent, or Firm* — Ward and Smith, P.A.; Ryan K. Simmons

(57) ABSTRACT

A bathing apparatus. The bathing apparatus may include a substantially horizontal bottom base; a wall extending vertical about a periphery of the bottom base, the wall may include a front wall portion, an opposing back wall portion, a first sidewall portion, and an opposing second sidewall portion, and wherein the bottom base and wall portions form a substantially oval shaped wash basin; one or more hand holds formed in an upper portion of one or more of the wall portions; a water inlet including a water supply hose, wherein the water supply hose attaches to a water dispersal device at a first end and a water supply source at a second end; a water outlet disposed in the bottom base, wherein the water outlet may include a drain hole and a drain hole plug; and wherein the wash basin has a length, depth, and width to accommodate a human patient.

13 Claims, 5 Drawing Sheets

(56) References Cited

U.S. PATENT DOCUMENTS

| | | | | |
|---|---|---|---|---|
| 5,924,146 | A * | 7/1999 | Ruiz Elosegui | A47K 3/022 4/538 |
| 6,966,900 | B1 * | 11/2005 | Chyba | A61H 33/00 604/290 |
| 9,888,814 | B2 * | 2/2018 | Malone | A47K 1/04 |
| 2005/0005350 | A1 * | 1/2005 | Johnson | A61G 7/0005 4/585 |
| 2024/0172897 | A1 * | 5/2024 | Pearlman | A47K 3/001 |

* cited by examiner

BATHING APPARATUS AND METHOD OF USING THE SAME

RELATED APPLICATIONS

This application is related and claims priority to U.S. Provisional Patent Application No. 63/546,042, filed on Oct. 27, 2023 the application of which is incorporate herein by reference in its entirety.

TECHNICAL FIELD

The subject matter of the invention relates generally to a bathtub, and more particularly to a lightweight bathing apparatus for use with disabled and/or non-ambulatory individuals.

SUMMARY

In one embodiment, a lightweight portable bathing apparatus is provided. The lightweight portable bathing apparatus may include a substantially horizontal bottom base; a wall extending substantially vertical about a periphery of the bottom base, wherein the wall may include a front wall portion, an opposing back wall portion, a first sidewall portion, and an opposing second sidewall portion, and wherein the bottom base and wall portions are configured to form a substantially oval shaped wash basin; one or more hand holds formed in an upper portion of one or more of the wall portions; a water inlet including a water supply hose, wherein the water supply hose is configured to attach to a water dispersal device at a first end and a water supply source at a second end; a water outlet disposed in the bottom base, wherein the water outlet may include a drain hole and a drain hole plug; wherein the wash basin is configured of a length, depth, and width to accommodate a human patient. The one or more hand holds may include a first hand hold formed in an upper portion of the first sidewall portion and an opposing second hand hold formed in an upper portion of the opposing second sidewall portion. The one or more hand holds may be positioned about midway along the length of their respective wall portion. The one or more hand holds may be formed as any of cut outs, indentations, outdentation, or handles. The water dispersal device may include a handheld shower head. The water supply source may include a standard sink faucet. The apparatus may further include a holder for the water dispersal device attachable to one of the wall portions of the wash basin, wherein the holder may be configured to releasably hold the water dispersal device in a stationary position when placed therein. The water outlet may be disposed proximate to an intersection of the rear wall portion and the bottom base. The apparatus may further include a drain hose configured to be in fluid communication with the drain hole. The apparatus may further include a head/neck support, which may include a first portion and a second portion, wherein the first and second portions may be configurable to form an elevated head/neck support, and wherein the head/neck support is one of removably or permanently attached to the bottom base. The head/neck support further may further include a groove configured to lock the first and second portions in an elevated position. A bottom surface of the bottom base is substantially flat.

In another embodiment, a method of using a lightweight portable bathing apparatus is provided. The method may include providing a lightweight portable bathing apparatus, including a substantially horizontal bottom base; a wall extending substantially vertical about a periphery of the bottom base, wherein the wall may include a front wall portion, an opposing back wall portion, a first sidewall portion, and an opposing second sidewall portion, and wherein the bottom base and wall portions are configured to form a substantially oval shaped wash basin; one or more hand holds formed in an upper portion of one or more of the wall portions; a water inlet including a water supply hose, wherein the water supply hose is configured to attach to a water dispersal device at a first end and a water supply source at a second end; a water outlet disposed in the bottom base, wherein the water outlet may include a drain hole and a drain hole plug; wherein the wash basin is configured of a length, depth, and width to accommodate a human patient. The method may further include, placing the wash basin atop a flat surface; placing a patient into the wash basin; positioning the patient in the wash basin; washing the patient via the water dispersal device; draining the wash basin via the water outlet; and removing the patient from the wash basin. The method may further include adding a desired amount of water to the wash basin prior to washing the patient. Placing the patient into the wash basin may include rolling the patient onto their side; placing the wash basin on its side and placing it next to the patient such that the wash basin is coupled behind the patient; and rolling the patient and the wash basin simultaneously back to a flat horizontal position. The apparatus may further include a head/neck support, including a first portion and a second portion, wherein the first and second portions are configurable to form an elevated head/neck support, and wherein the head/neck support is one of removably or permanently attached to the bottom base. Positioning the patient in the wash basin may include elevating the patient's head/neck to a desired height via the head/neck support. The method may further include attaching the water supply hose to the water supply source prior to washing the patient. The water supply source may include a standard sink faucet. The water dispersal device may include a handheld shower head.

BACKGROUND

Care for patients that are diagnosed disabled and/or non-ambulatory can be difficult for both the patients and their caretakers. For example, when bathing a patient in a basin with soap and water it can be an arduous and time consuming process.

Transferring a patient from the bed to the bathroom may cause injuries to both the patient and the caregiver. Further, helping the patient into (and out of) the bathtub adds an additional cumbersome task. Additionally, during the bath, the water builds up and after a while the water becomes dirty and needs to be replaced with fresh clean water. While using a bathtub that is in a bathroom, the water can be drained and additional water can come from the faucet. For bathtubs that are portable, draining used water and replacing it with fresh water can be difficult. These types of bathtubs require the caretaker to change the water several times to bathe the patient properly. However, bathing the patient is a task that needs to happen at least once a day to allow the patient to have their body properly cleaned. The high degree of difficulty of properly bathing a patient confined to a bed could lead to times where the patient goes multiple days where they do not have their body properly cleaned. Ignoring their hygiene for prolonged periods of time can lead to the development of a skin disorder or even a breakdown of the skin that can lead to an increase of pressure ulcers.

What is needed is a bathing apparatus that offers easy access and use to individuals with limited mobility and their caretakers.

BRIEF DESCRIPTION OF FIGURES

Figure 1:
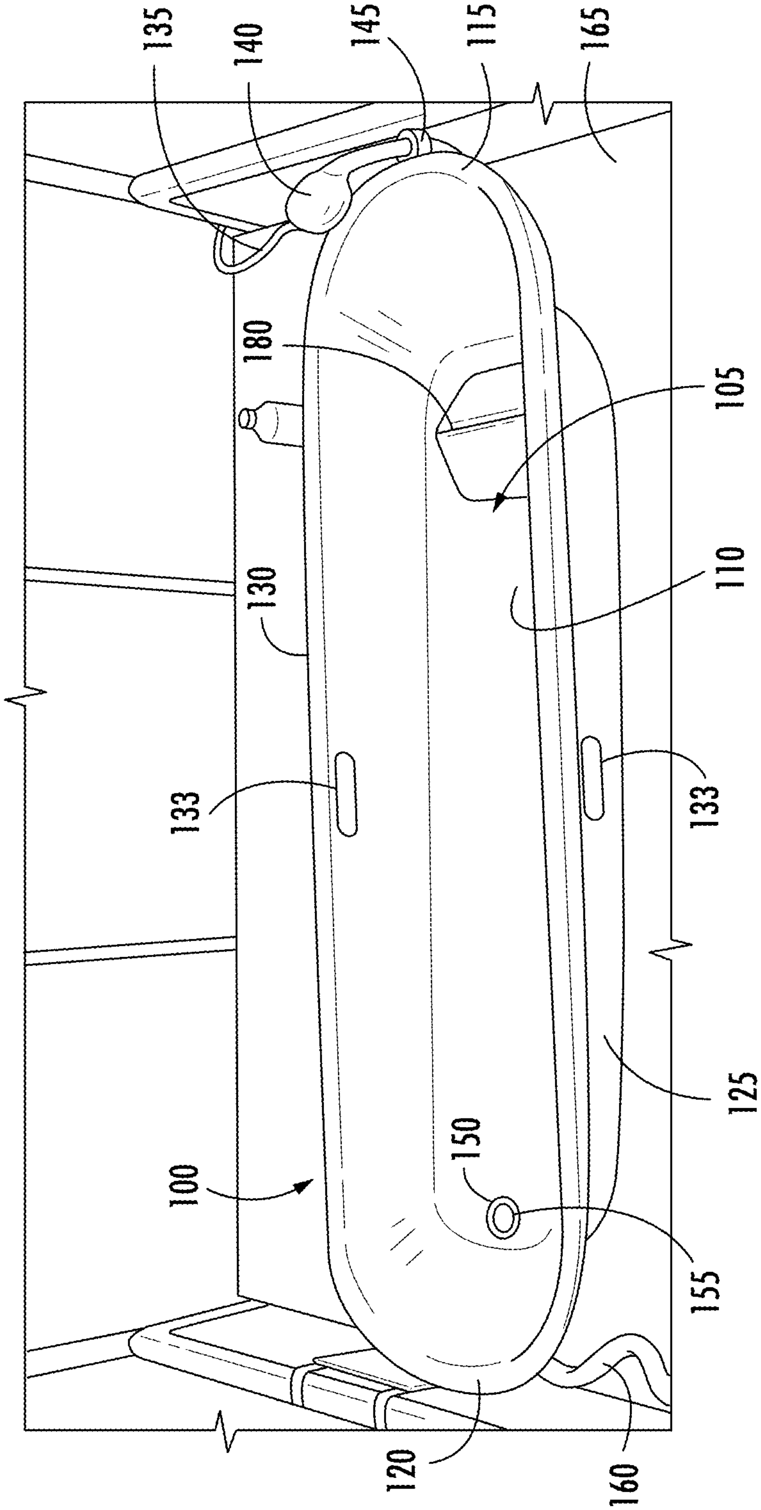
Figure 2:
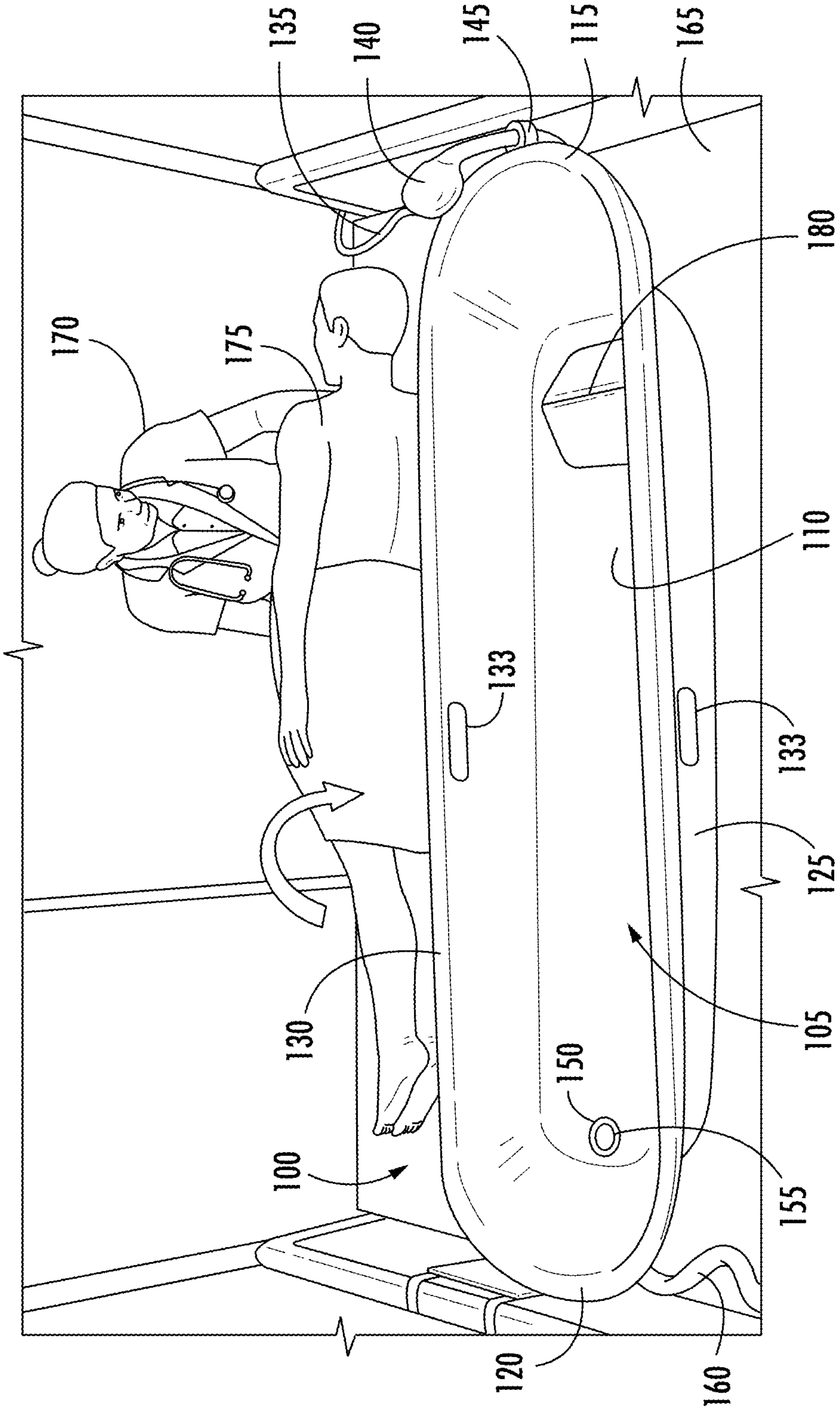
Figure 3:
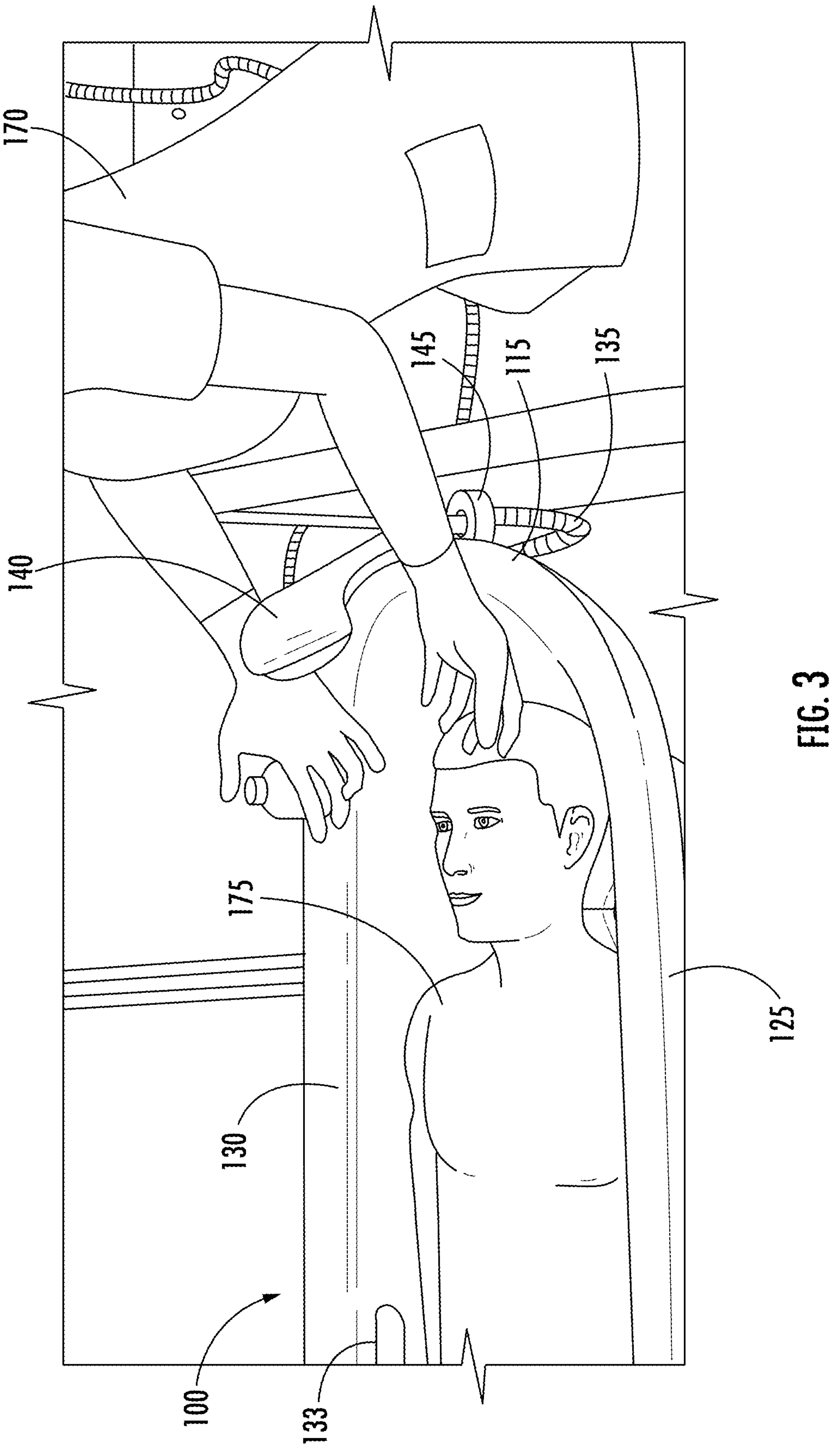
Figure 4:
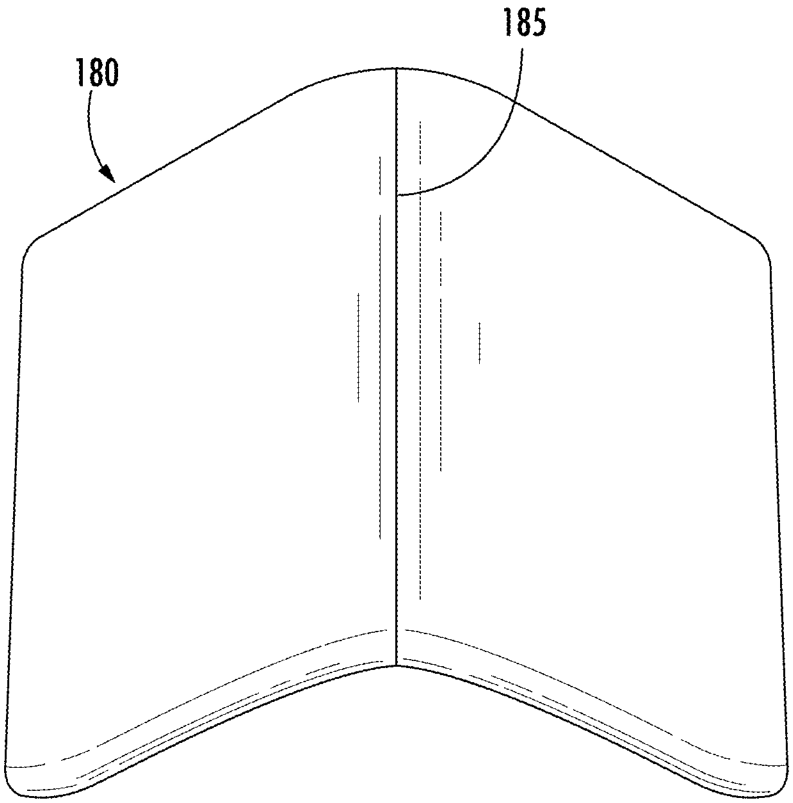
Figure 5:
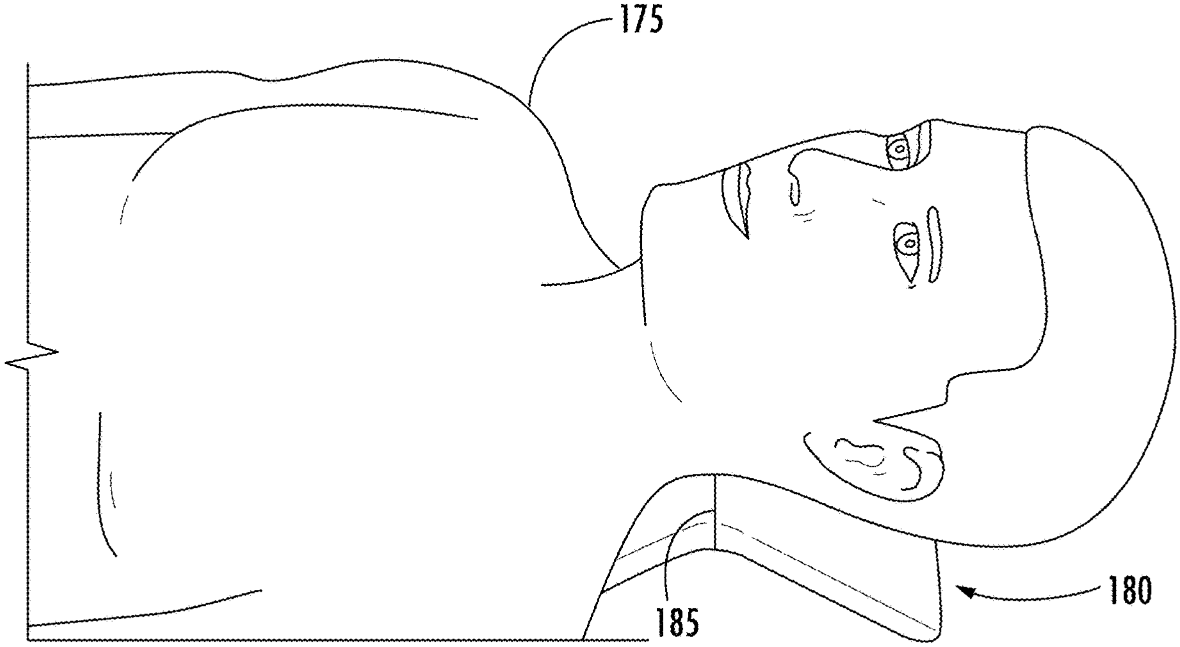

Having thus described the subject matter in general terms, reference will now be made to the accompanying drawings, which are not necessarily drawn to scale, and wherein:

FIG. 1 shows a perspective view of an example of a bathing apparatus, in accordance with an embodiment of the invention;

FIG. 2 shows a perspective view of a patient being placed into the bathing apparatus, in accordance with an embodiment of the invention;

FIG. 3 shows a perspective view of an embodiment of the bathing apparatus in use, in accordance with an embodiment of the invention;

FIG. 4 shows a perspective view of an example of a head/neck support for use with the bathing apparatus, in accordance with an embodiment of the invention; and FIG. 5 shows a perspective view of an embodiment of the head/neck support in use, in accordance with an embodiment of the invention.

DETAILED DESCRIPTION

In one example embodiment, a lightweight portable bathtub is provided. The lightweight bathtub, may include an oval shape bathtub made from polypropylene that is designed to rest on the top surface of a bed for disabled patients. The design of the bathtub allows the patient to be easily rolled into the bath tub from their side. The bathtub may include a handheld shower head attachable to a nearby faucet to provide water for the patient to bathe. The bathtub may further include a drainage hole with a drain hose attachable to the bottom side of the bathtub to allow for water to be drained away from the bathtub. A head/neck support may be attached to the interior surface of the bathtub to allow the patient to elevate their head while bathing. In this way, the device allows disabled patients to receive hygienic care that they require while avoiding the inconvenience of transporting them into the bathroom.

Referring now to FIG. 1, there is shown a perspective view of an example of a bathtub 100. The bathtub 100 may include an opened top 105, a substantially horizontal bottom base 110, a front wall 115, a back wall 120, a first sidewall 125, and a second sidewall 130. The bathtub 100 may be of a generally oval shape. The bathtub 100 may further include hand holds 133. For example, bathtub 100 may include two opposing hand holds 133 one positioned/formed on an upper portion of each of first sidewall 125 and second sidewall 130, wherein the hand holds 133 may be positioned about midway along the length of the bathtub 100. Hand holds 133 maybe through cut holes, indentations, outdentations, or handles of a suitable size, shape, and depth to allow a person's hand to easily grasp hand holds 133. In one non-limiting example, bathtub 100 may have a length in the range of about 60 inches to about 72 inches, a width in the range of about 12 inches to about 24 inches, and a depth in the range of about 5 inches to about 10 inches. However, bathtub 100 may be of any suitable length, width, and depth to allow for use with a human patient, and the dimensions listed herein are exemplary only. The bathtub 100 may be made of polypropylene or other suitable materiel and is preferably lightweight for ease of transporting and maneuvering, and able to be placed upon a suitable surface, e.g., a bed of a patient.

The bathtub 100 may further include a water supply hose 135. Water supply hose 135 may supply water into the bathtub 100. A first end of the water supply hose 100 may be attachable to a handheld shower head 140 and a second end may be attachable to a faucet (not shown). The water supply hose 135 may be attachable to the faucet by a universal adapter (not shown), or any other well-known suitable adapter or mechanism, disposed on the second end of the water supply hose 135. The front wall 115 of tub 100 may further include a shower head holder 145. The handheld shower head 140 may be attachable to the shower head holder 145, such that the handheld shower head 140 may remain in a stationary position and also may be easily removable as needed. Additionally, a drainage hole 150 may be disposed in the horizontal bottom base 110 to allow water to be drained from the bathtub 100. Drainage hole 150 may be disposed closer to the rear wall 120 of bathtub 100. In one example, drainage hole 150 may be disposed in the bottom base 110 proximate to the intersection of the rear wall 120 and the bottom base 110. Drainage hole 150 may include a drain plug 155, which may be used to prevent water from draining out of the drainage hole 150. The drainage hole 150 may further include a drainage hose 160 disposed on an underside of the horizontal bottom base 110 of the bathtub 100 and in fluid communication with drainage hole 150 to allow for drainage of the water out of the bathtub 100.

Referring now to FIGS. 2 and 3, there are shown perspective views of an example of the bathtub 100 in use. The bathtub 100 may be placed upon the top of a bed 165, for example, or other suitable/desired surface. A caretaker 170 may help a patient 175 into the bathtub 100. In one example, the caretaker 170 may roll the patient 175 onto their side and then place the bathtub 100 next to the patient 175 such that it is coupled behind them. The caretaker 170 may then roll the patient 175 and the bathtub 100 back upright onto the bed, thereby safely transferring the patient 175 into the bathtub 100 atop the bed. When the patient 175 is in the bathtub 100, the caretaker 170 may begin washing the patient 175. The handheld shower head 140 may remain in the shower head holder 145, or may be removed from the shower head holder 145 to reach different parts of the body of patient 175.

Referring now to FIGS. 4 and 5, there are shown perspective views of an example of a flap hinge (head/neck support) 180 for use in the bathtub 100. The flap hinge 180 is disposed on the horizontal bottom base 110 of bathtub 100, and may be positioned closer to the front wall 115 of bathtub 100. The flap hinge 180 may further include a groove 185 that locks the flap hinge 180 in place in an elevated position. When the flap hinge 180 is not engaged to the groove 185, it may lay flat on the horizontal bottom base 110 of bathtub 100. Engaging the flap hinge 180 into the groove 185, thereby locking the flap hinge 180 in an elevated position, allows the patient 175 to elevate their head by resting it on the flap hinge 180. Elevating the head of the patient 175 helps keep their head out of the water and can help the caretaker 170 when applying shampoo, conditioner, and/or other hair products to the patient's head. In one non-limiting example, flap hinge 180 when in the elevated position, may have a height in the range of about 3 inches and at about a 45 degree angle.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

The terms "comprise," "comprises," "comprising," "include," "includes," and "including," are intended to be non-limiting, such that recitation of items in a list is not to the exclusion of other like items that may be substituted or added to the listed items.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present invention.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

Various modifications and variations of the disclosed methods, compositions and uses of the invention will be apparent to the skilled person without departing from the scope and spirit of the invention. Although the subject matter has been disclosed in connection with specific preferred aspects or embodiments, it should be understood that the subject matter as claimed should not be unduly limited to such specific aspects or embodiments.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A lightweight portable bathing apparatus, comprising:

a. a substantially horizontal bottom base made of polypropylene;

b. a wall extending substantially vertical about a periphery of the bottom base, wherein the wall comprises a front wall portion, an opposing back wall portion, a first sidewall portion, and an opposing second sidewall portion, and wherein the bottom base and wall portions are configured to form a substantially oval shaped wash basin;

c. at least one hand hold cut out formed in an upper portion of each of the first and second sidewall portions, each hand hold cut out being a through cut hole positioned about midway along the length of the bathing apparatus;

d. a water inlet comprising a water supply hose, wherein the water supply hose is configured to attach to a handheld water sprayer at a first end and a water supply source at a second end;

e. a water outlet disposed in the bottom base proximate to an intersection of the back wall portion and the bottom base, wherein the water outlet comprises a drain hole formed through the horizontal bottom base and a drain plug, wherein the drain plug is configured to removably plug the drain hole in a water tight configuration;

f. wherein the wash basin is configured of a length, depth, and width to accommodate a human patient; and g. a head/neck support disposed on the horizontal bottom base and positioned closer to the front wall portion, comprising: a first portion, a second portion, and a locking groove disposed at an intersection of the first portion and the second portion, wherein the locking groove when engaged with the first portion and the second portion is configured to lock the first and second portions in a first state comprising an elevated position at about a 45 degree angle, and when not engaged to allow the first and second portions to lay flat on the horizontal bottom base in a second state.

2. The apparatus of claim 1, wherein the handheld water sprayer comprises a handheld shower head.

3. The apparatus of claim 1, wherein the water supply source comprises a sink faucet.

4. The apparatus of claim 1, further comprising a holder for the handheld water sprayer attachable to one of the wall portions of the wash basin, wherein the holder is configured to releasably hold the handheld water sprayer in a stationary position when placed therein.

5. The apparatus of claim 1, further comprising a drain hose configured to be in fluid communication with the drain hole.

6. The apparatus of claim 1, wherein a bottom surface of the bottom base is substantially flat.

7. A method of using a lightweight portable bathing apparatus, the method comprising:

a. providing a lightweight portable bathing apparatus, comprising:

i. a substantially horizontal bottom base made of polypropylene;

ii. a wall extending substantially vertical about a periphery of the bottom base, wherein the wall comprises a front wall portion, an opposing back wall portion, a first sidewall portion, and an opposing second sidewall portion, and wherein the bottom base and wall portions are configured to form a substantially oval shaped wash basin;

iii. at least one hand hold cut out formed in an upper portion of each of the first and second sidewall portions, each hand hold cut out being a through cut hole positioned about midway along the length of the bathing apparatus;

iv. a water inlet comprising a water supply hose, wherein the water supply hose is configured to attach to a handheld water sprayer at a first end and a water supply source at a second end;

v. a water outlet disposed in the bottom base proximate to an intersection of the back wall portion and the bottom base, wherein the water outlet comprises a drain hole formed through the horizontal bottom base and a drain plug, wherein the drain plug is configured to removably plug the drain hole in a water tight configuration; and vi. wherein the wash basin is configured of a length, depth, and width to accommodate a human therein; and vii. a head/neck support disposed on the horizontal bottom base and positioned closer to the front wall portion, comprising: a first portion, a second portion, and a locking groove disposed at an intersection of the first portion and the second portion, wherein the locking groove when engaged with the first portion and the second portion is configured to lock the first and second portions in a first state comprising an elevated position at about a 45 degree angle, and when not engaged to allow the first and second portions to lay flat on the horizontal bottom base in a second state;

b. placing the wash basin atop a flat surface;

c. placing a patient into the wash basin;

d. positioning the patient in the wash basin;

e. washing the patient via the handheld water sprayer;

f. draining the wash basin via the water outlet; and g. removing the patient from the wash basin.

8. The method of claim 7, further comprising adding a desired amount of water to the wash basin prior to washing the patient.

9. The method of claim 7, wherein placing the patient into the wash basin comprises rolling the patient onto their side; placing the wash basin on a side thereof and placing the wash basin next to the patient such that the wash basin is coupled behind the patient; and rolling the patient and the wash basin simultaneously back to a flat horizontal position.

10. The method of claim 7, wherein positioning the patient in the wash basin comprises elevating a patient's head/neck to a desired height via the head/neck support.

11. The method of claim 7, further comprising attaching the water supply hose to the water supply source prior to washing the patient.

12. The method of claim 11, wherein the water supply source comprises a sink faucet.

13. The method of claim 7, wherein the handheld water sprayer comprises a handheld shower head.

* * * * *